INVENTORS
IMRE A. SZUPKAY
ROBERT W. SHEEHAN
BY
AGENT

Oct. 17, 1967  R. W. SHEEHAN ETAL  3,347,578
FLUSH-TYPE SAFETY LATCH

Filed Nov. 18, 1964  4 Sheets-Sheet 2

INVENTORS.
IMRE A. SZUPKAY
ROBERT W. SHEEHAN
BY

AGENT

INVENTORS
IMRE A. SZUPKAY
ROBERT W. SHEEHAN

BY

AGENT

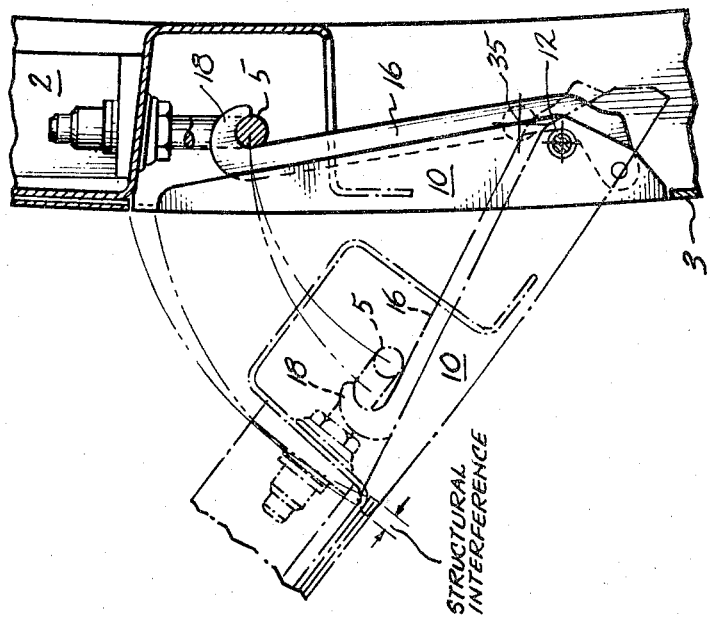
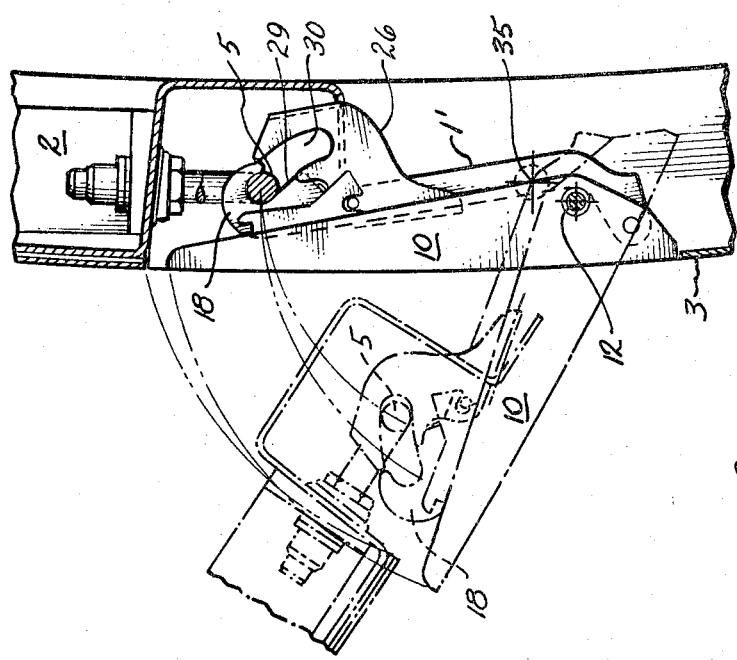

United States Patent Office 3,347,578
Patented Oct. 17, 1967

3,347,578
FLUSH-TYPE SAFETY LATCH
Robert W. Sheehan, Bellevue, and Imre A. Szupkay, Issaquah, Wash., assignors to The Boeing Company, Seattle, Wash., a corporation of Delaware
Filed Nov. 18, 1964, Ser. No. 411,983
1 Claim. (Cl. 292—113)

This invention relates to a flush-type safety latch of the lever operated type, especially adapted to draw mating structures into a tight closure with one another and particularly suitable for securing removable panels, hinged panels or doors employed in aircraft.

It is an object of this invention to provide a flush-type safety latch which is provided with a safety hook which together with the latch hook provides an enclosure for a keeper bar and allows for radial displacement of the keeper bar relative to the latch hook without unlatching.

It is another object of this invention to provide a flush-type safety latch which can be used on panels adapted to right hand and left hand opening and wherein the latch can be used at the hinge side as well as at the closing side of the panel and wherein a safety catching member prevents accidental disengagement of the latch located at the hinge side of the panel.

It is another object of this invention to provide a flush-type safety latch which can be used at the hinge side of a panel of compound curvature and wherein the latch is provided with a means to prevent accidental disengagement as well as means that allows opening of the panel without structural interference.

Furthermore, this invention provides other objects, features and advantages which will become fully apparent from the following detailed description taken in conjunction with the accompanying drawings which illustrate and clarify the preferred embodiment of this device.

Figure 3:
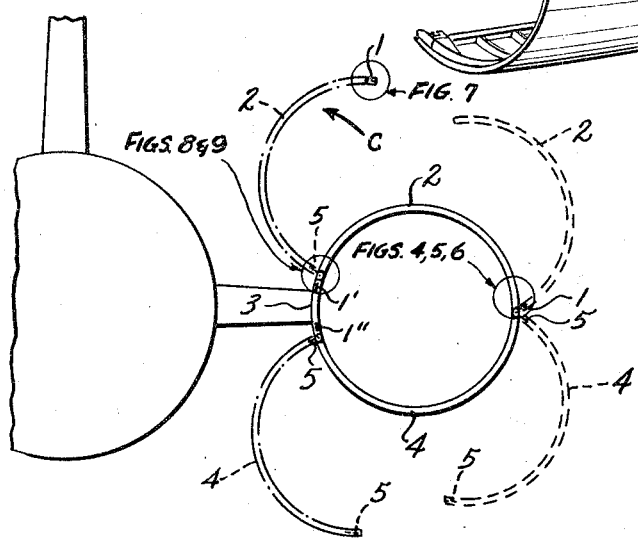

In FIGURE 3 is shown a partly sectional front view of an airplane nacelle mounted on a short wing strut and wherein the two opposing directions in which each cowling can be opened is illustrated in dashed line fashion.

Figure 4:
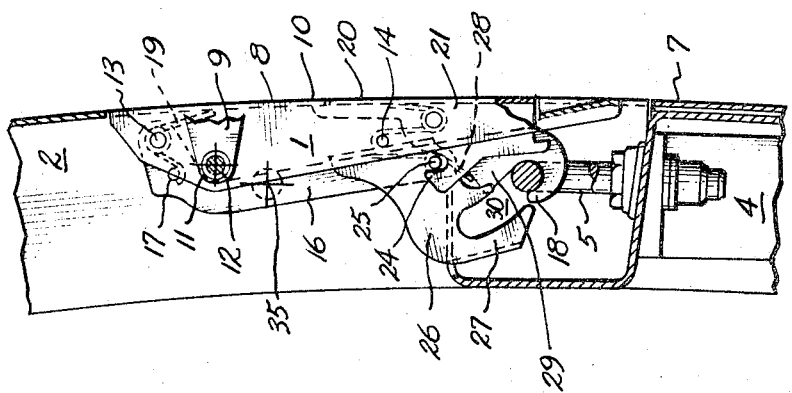

FIGURE 4 is a cross section of the latch in an engaged position with the mating structures.

Figure 5:
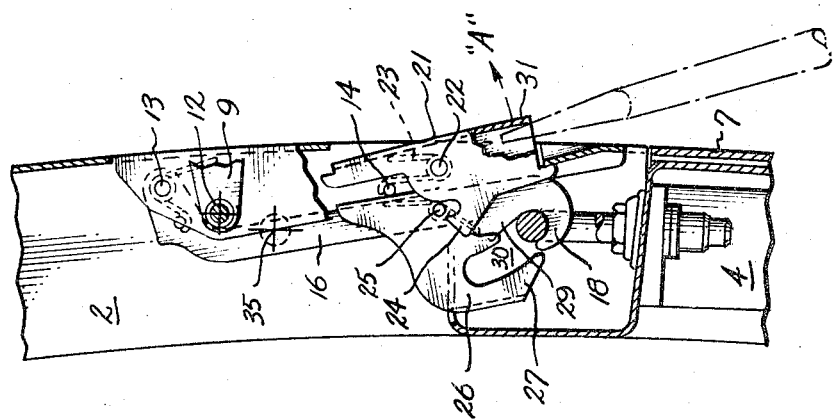

FIGURE 5 is a cross section of the latch wherein the first step is shown for opening the cowling by the aid of a probing tool such as a screw driver or the like.

Figure 6:
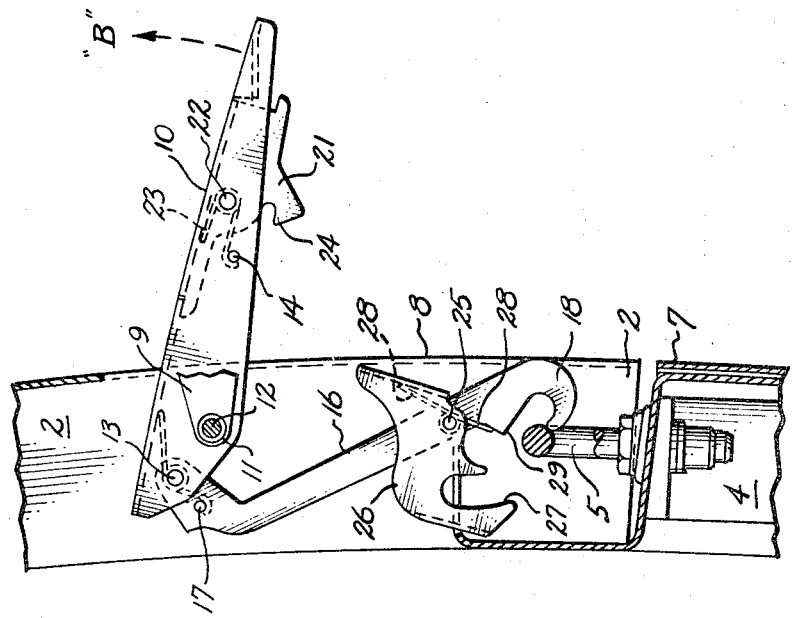

FIGURE 6 illustrates the second step for disengaging the latch by the outward pivoting movement of the handle member which causes the latching member to unhook from the keeper bar.

Figure 7:
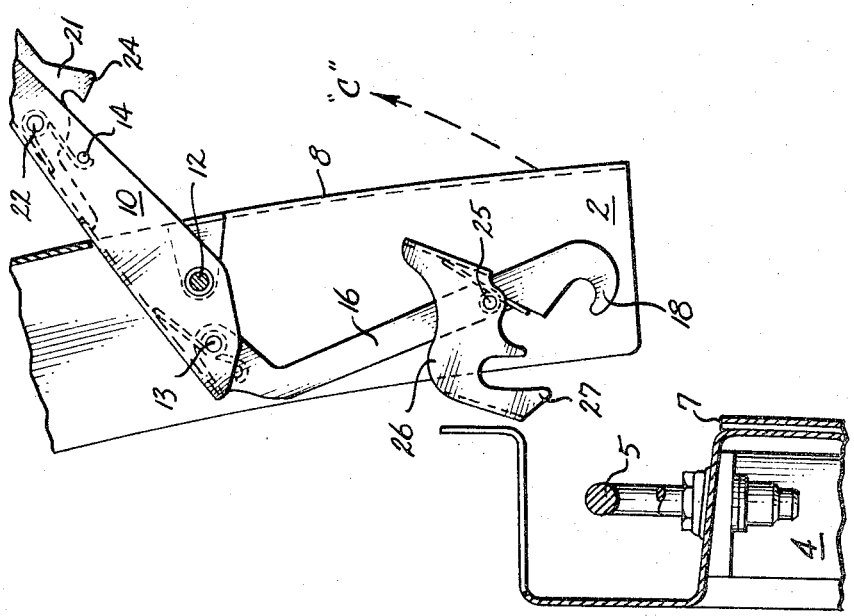

FIGURE 7 illustrates the third step for opening the cowling by swinging the cowling panel away from the mating structure in an outward radial direction.

Figure 1:
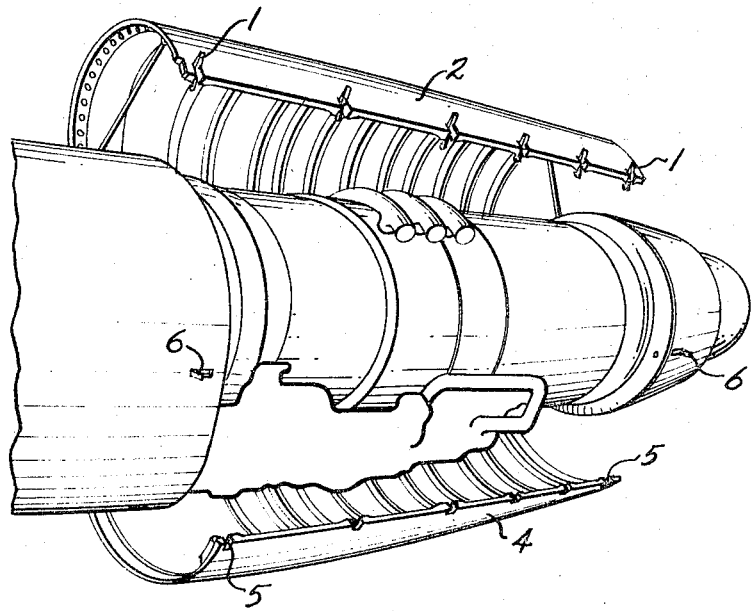
FIGURE 1 illustrates a perspective view of an aircraft nacelle having the upper and lower cowling in one opened position.

FIGURE 8 shows a cross section of the latch located at the hinge side of the opened cowling as illustrated in FIGURES 1 and 3, however the unique improvement is not incorporated on this latch and accidental disengagement is obvious as illustrated.

FIGURE 8 is only for explanatory purposes and comparison with the next FIGURE 9 will clearly show the improvements which are achieved by the additional safety catching member and the ramp portion on the latching member.

FIGURE 9 shows the same cross section of the engaged latch as in FIGURE 8, however, with the unique improvements incorporated.

In general the safety flush-type latch is intended primarily for use in aircraft although it may be employed wherever a draw-in safety flush-type locking device is desired.

Referring now to the drawings wherein like reference characters designate corresponding parts throughout the figures, there is shown in FIGURE 1 a safety flush-type latch 1 mounted at several places on an upper cowling panel 2 of an aircraft nacelle. The lower cowling panel 4 of the nacelle is provided with keeper bars 5, mounted therein, which are matching with the safety flush-type latches 1 provided in the upper cowling panel 2 of the aircraft nacelle.

In FIGURE 1 the upper cowling panel 2 and the lower cowling panel 4 are both in an open position and the safety flush-type latches 1 are also in the unlatched position.

Figure 2:
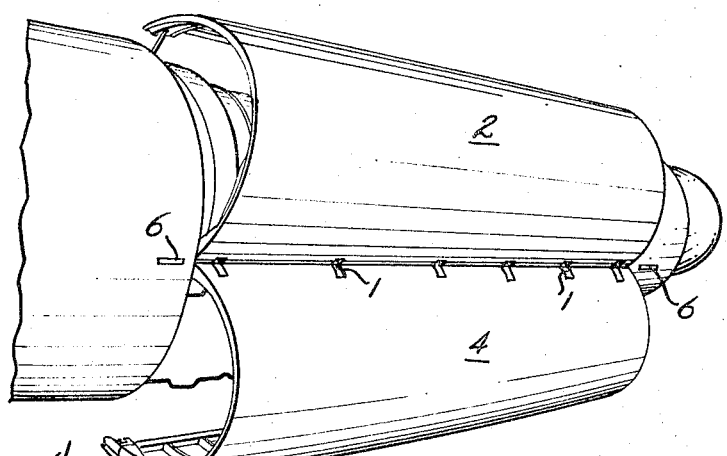
FIGURE 2 shows the same perspective view of the aircraft nacelle having its upper and lower cowling opened in an opposite position than shown in FIGURE 1.

In FIGURE 2 the upper cowling panel 2 and the lower cowling panel 4 are opened in the direction opposite to that shown in FIGURE 1. The safety flush-type latches 1 are in an engaged position, however, enough absorption of displacement is provided in the unique structure of latch 1 to allow the cowling panels 2 and 4 to be opened and whereby the latches 1 will remain in an engaged position. The rotation of the cowling panels 2 and 4 is accomplished by pivoting of the panels 2 and 4 about both retractable hinge devices 6 mounted in the nacelle at each side of the panels on a common axis; however, the common axis is not co-axial with the pivot point of each catch due to the compound curvature of the panels.

In FIGURE 3 the upper cowling panel 2 is shown in a closed position and in a dashed line fashion shown in the two opposing open directions. As illustrated, the upper cowling panel 2 is provided with a plurality of latches 1 on one side of its outer edge while the lower panel 4 is provided with a plurality of keeper bars 5 on each outer edge, and latches are mounted on the fixed cowling 3 on both the lower and upper edges.

It should be understood that the latch 1 does not operate as a hinge device but only as a locking device. In other words, in the illustration of FIGURE 2 the upper and lower cowling panels 2 and 4 are not rotating about the closed latches 1 as a pivot point, but rather pivot about both retractable hinging devices 6 and thus rotate along an imaginary hinge line formed by an extension of the axis of the devices 6.

In FIGURE 4 the safety flush-type latch 1 is shown as being mounted in the upper cowling panel 2 adapted to fit within the mating structure section 7 of the lower cowling panel 4 when the upper cowling panel 2 is in a closed position. The lower cowling panel 4 is provided with a keeper bar 5 preferably adjustable. The upper cowling panel 2 is provided with an accommodation slot 8 disposed in registry with each keeper bar 5. At the inside of the upper cowling panel 2 adjacent to the end of the accommodation slot 8 remote from the margin of the panel structure, is a pair of brackets 9.

The safety flush-type latch 1 is provided with a handle 10 adapted to fit within the accommodation slot 8; the handle 10 may be formed of sheet material and is channel-shaped in cross section so that the web of the channel thus formed, completely fills the slot 8. The flanges of the handle 10 are extended adjacent the brackets 9 and connected by a bushing 11 which receives a journal pin 12 extending through the brackets 9. Beyond the fulcrum axis or journal pin 12, that is, on the side thereof, opposite from the keeper bar 5, the handle 10 is provided with a tubular journal 13 which pivotally supports and connects a hook member or latching mmeber 16 to the upper end of the handle 10. The latching member 16 is substantially L shaped in side aspect so as to curve around and clear the journal pin 12, and furthermore is forked shaped and provided with a spacer 17 which connects each fork leg. The extended end of the latching member 16 is provided with a hook 18 which is engaged with the keeper bar 5. A spring 19 FIG. 4, is coiled about the tubular journal 13, one end of the spring 19 bears against the handle 10 and the other end bears against the spacer 17, so as to urge the latching member 16 away from the handle 10 or if the latching member 16 is restrained, to pivot the handle 10 outwardly (B) in a position as shown in FIGURE 6.

The handle 10 is provided with a slot or aperture 20 which receives a trigger member 21. Trigger member 21 is formed from a sheet metal and folded so as to be U-shaped or channel-shaped in cross section. The web 31 of the chanel thus formed, completely fills the slot 20. A cross pin 22 extends through the flanges of the handle 10 and trigger member 21 pivotably connecting the two elements together so that the web or trigger member 21 may be pivoted between a flush position in the handle 10 and in an angular position in relation with the web of the handle 10, as shown in FIGURE 5. A spring 23 is coiled about the pin 22 and braced between the trigger member 21 and spacer 14 on handle 10 in such a manner as to urge the trigger member to maintain its flush position as shown in FIGURE 4. It should be noted in FIGURE 5, that the trigger member 21 is shown in an angular position in opposition to the action of the spring 23. The legs of the trigger member 21 terminate in hooked ends or catch elements 24 which are adapted to hook about a pin 25 mounted thorugh the latching member 16.

A safety trigger pivotable catching member 26, formed of sheet metal and folded so as to be U-shaped or channel-shaped in cross section, and provided with forked shaped hooked portions 27 is pivotally mounted about said pin or second keeper 25 and further provided with a spring 28 which is biased so that the hook portions 27 will tend to turn away from the hook 18 of the latching member 16, as shown in FIGURE 6 and FIGURE 7. A slightly curved longitudinally-shaped slot 30 is thus formed by the hook portions 27 and the hook 18 and ramp portion 29 of the latching member 16, when the latch 1 is held in an engaged position by spacer 14 on handle 10 restraining the catching member 26 as shown in FIGURES 4, 5 and 9. The slot 30 of the latch 1 prevents disengagement of the latching member 16 from keeper bar 5.

Having thus described the several parts and their functions, by reference characters the disengaging operation of the latch is as follows:

Assuming that the cowling panel 2 is in a closed position with the cowling panel 4 as shown in FIGURE 4 then releasing of the latch takes place in several steps. The first step of disengaging the latch is shown in FIGURE 5; because of the tight closure of the latch it is preferable to use a leverage device, such as a screw driver. By inserting this tool under a manually engageable web portion 31 of the trigger and moving it in the direction A, the trigger member 21 will move from its flush position into an angular position as shown. The trigger member 21 pivots about cross pin 22 and its latching portion or hooked ends 24 will thereby disengage themselves from pin 25. As soon as the trigger member 21 is disengaged from the pin 25, the handle 10 will move into the direction "B" by the urging of spring 19 thereby pushing the handle 10 in a counterclockwise direction as viewed in FIGURE 6.

In FIGURE 6 the the handle 10 pivots about a journal 12 which results in a radial movement and different position of the journal or hinge point 13 so that the latching member 16 and its extended hook 18 are moved towards the keeper bar 5 which results in disengagement of hook 18 from the keeper bar 5 and further in a slight separation between the cowling panel 2 and crowling panel 4 through their own structural tension. Also at the same time that the handle 10 moves about the journal pin 12 the spacer 14 has moved away with the handle 10, which permits spring 28 to rotate the safety trigger catching member 26 about its pin 25, so that a complete disengagement of hook portions 27 and hook 18, with respect to the keeper bar 5, is accomplished. As shown in FIGURE 7 the cowling panel 2 can thus be opened when all latching devices 1 are disengaged from their keeper bars 5 and moved into the direction C as shown in FIGURE 7.

The operation of the latch 1 when located at the hinged side of a panel is as follows:

Referring to FIGURE 3, the upper cowling 2 was opened by unlatching the latches 1 as explained above and illustrated by FIGURES 4, 5, 6 and 7.

The latch 1' and 1" are identical in operation to latch 1 and, depending on the direction of opening of the cowling panels 2 and 4 are either disengaged or remain engaged. In practice it has frequently happened that latches which are never disengaged became unlatched and this condition was not visible because the handle member 10 stayed flush with its surrounding area caused by the engagement of the trigger member 21. The unlatching took place at the hook 18 of latching member 16 from the keeper bar 5. It was discovered that airplanes were flying with unlatched cowlings panels, which could be very dangerous. The unlatched condition occurred at the latches which were located at the hinged side of a cowling panel that had been opened for inspection.

In FIGURE 3, assuming that the cowling panel 2 is opened in the direction C by going through the steps as explained and illustrated in FIGURES 4, 5, 6 and 7, then the latch 1' at the hinged side of the cowling panel 2 has to be remained engaged.

Referring now to FIGURE 8, and presuming that the novel improvement has not been incorporated in latch 1, then when cowling panel 2 is rotated into the direction C; the latch will pivot about the journal pin 12 and the cowling panel 2 will pivot at the imaginary hinge line or pivot point 35 formed by the extension of the axis of the devices 6. Pivot point 35 is also illustrated in FIGS. 4, 5, and 8. As can be seen in FIGURE 8 the arc of both the forementioned rotations are slightly different, due to the displacement of pivot point 12 from pivot point 35 which is a result of the compound curvatures of the cowling panel in the longitudinal as well as translateral direction. The pivot 12 will be at a slightly different location for each individual latch 1' with respect to pivot point 35, because of the compound curvature of the cowling.

Referring now to FIGURE 9 and assuming that the cowling panel 2 is opened in the same direction C as described before, accidental unlatching of the hook 18 from the keeper bar 5 is prevented through the safety trigger member 26 which forms a slot 30 and confines the keeper bar 5 by allowing a limited displacement so that when the cowling panel 2 is closed, the keeper bar 5 and hook 18 will engage again and thus accidental disengagement is prevented.

Also, as illustrated in FIGURE 8, a complete opening of the cowling panel 2 is impossible, because of interference of the mating structure with the handle 10 which is a direct result of the different arcs of rotation as has been mentioned above. In order to avoid this structural interference latching member 16 is provided with a ramp portion 29. This ramp portion 29 has two important functions; first to form a slightly curved slot 30 together with the hook portions 27 and hook 18 for holding keeper bar 5 engaged with the latch; and second to guide the latch with respect to the keeper bar 5 so that interference with the adjacent structure is avoided. (See FIGURE 9.) The operational steps of disengaging the latches 1' and 1" and the operational steps of the latches 1 and 1" when located on the hinge side is identical to the respective steps previously described, therefore additional description will be repetitious.

Having thus described this invention it will be obvious that various other structural modifications may be contemplated by those skilled in the art without departing from the spirit and scope of the invention as hereinafter defined by the appended claim.

We claim:

A latch for connecting first and second structures comprising,
(a) pivotable handle means (10) for the first structure (2),
(b) keeper means (5) for the second structure,
(c) latching portion means (14) for said handle means (10),
(d) latching member means (16) having hook means (18),
(e) trigger means (21) for said handle means (10) for connecting with said latching member means (16),
(f) catching member means (26) having hook means (27) for connecting with said keeper means (5),
(g) first spring means (19) for urging said latching member hook means (18) into engagement with said keeper means,
(h) second spring means (23) for urging said trigger means (21) into connection with said latching member means (16), and
(i) third spring means (28) for urging said catching member means (26) unhooked from said keeper means (5),
(j) said handle latching portion means (14) restraining said catching member means (26) against said third spring means (28) to form a curved slot between said catching member hook means (27) and said latching member hook means (18) to retain first keeper (5) when the latch connects the first and second structures.

References Cited

UNITED STATES PATENTS

| | | | |
|---|---|---|---|
| 259,559 | 6/1882 | Langley | 292—108 |
| 2,703,431 | 3/1955 | Tatom | 292—108 X |
| 2,712,955 | 7/1955 | Andrews | 292—113 |
| 2,944,848 | 7/1960 | Mandolf | 292—181 |
| 3,259,412 | 7/1966 | Wheeler | 292—113 |

FOREIGN PATENTS 554,933  1/1957  Italy.

MARVIN A. CHAMPION, *Primary Examiner.*

EDWARD C. ALLEN, *Examiner.*

J. R. MOSES, *Assistant Examiner.*